Oct. 30, 1951          J. A. DEUBEL          2,573,661
            THERMOSTATIC STOKER CONTROL SYSTEM
Filed April 5, 1948                    2 SHEETS—SHEET 1

INVENTOR.
Justin A. Deubel
BY
Tate, Wheeler & Weichart

Patented Oct. 30, 1951

2,573,661

UNITED STATES PATENT OFFICE 2,573,661

THERMOSTATIC STOKER CONTROL SYSTEM

Justin A. Deubel, Hales Corners, Wis., assignor to Perfex Corporation, Milwaukee, Wis., a corporation of Wisconsin Application April 5, 1948, Serial No. 19,109

4 Claims. (Cl. 236—9)

This invention relates to control systems for heating plants, and more particularly to control systems or circuits for controlling the operation of electric fuel feeding means such as a stoker.

Satisfactory control of stoker operation requires that the stoker mechanism be made to feed fuel to a combustion chamber whenever the temperature of the room or enclosure being heated falls below the predetermined control temperature. In addition to this, the fuel feeding means must be made to operate to feed fuel to the combustion chamber whenever additional fuel is needed to maintain combustion, this type of operation being commonly referred to as a "holdfire operation."

A well known method of attaining the control functions mentioned above utilizes an electric motor operated cam switch means to periodically close the circuit for the fuel feeding means to provide holdfire operation, and an enclosure temperature responsive device such as a room thermostat with a circuit therefor to independently energize the fuel feeding means whenever the enclosure temperature drops below the control value. Such control systems necessarily require rather complicated apparatus for adjusting the duration and frequency of the periodic holdfire operations. In addition, since the room thermostat and the holdfire mechanism energize the fuel feeding means independently, a holdfire operation may begin immediately after the room thermostat has opened, thereby causing the temperature in the enclosure being heated to overshoot, i. e., rise above the control value.

Thermal type stoker control systems wherein the holdfire operations are initiated by a movement of a thermal responsive element which is located to respond to temperatures in the stack, combustion chamber or fuel bed, have overcome somewhat the difficulties pointed out above, however, attempted development of a trouble-free, rugged, and sensitive device having a thermal element extending into these high temperature locations and adapted to actuate a switching mechanism by expansion or contraction of a thermal element, has not been entirely successful.

The principal object of this invention is to provide a fuel feeding means control circuit which establishes a combustion chamber temperature value at which operation of the fuel feeding means is initiated, establishes a relatively higher combustion chamber temperature value at which the fuel feeding means is shut down, thus providing holdfire operations, utilizes an enclosure temperature responsive device or room thermostat which initiates operation of the fuel feeding means whenever the temperature of the enclosure drops below the control point, and establishes a combustion chamber temperature value greater than either of the combustion chamber temperature values previously mentioned, at which the fuel feeding means is shut down independently of the enclosure temperature responsive means.

A further object is to provide a control circuit utilizing a bridge type resistance network and an electrical discharge tube whose control electrode or grid voltage is determined by the unbalanced potential across the resistance network, a switch operative upon conduction by the tube to apply a relatively small additional bias voltage to the control electrode, and a temperature responsive switch which, when actuated, applies a relatively large additional bias voltage to the control electrode.

A further object is to provide a control circuit wherein the combustion chamber temperature at which a holdfire operation of the fuel feeding means is initiated, the combustion chamber temperature at which a holdfire operation is terminated, and a combustion chamber temperature at which the operation of the fuel feeding means is terminated independently of the room thermostat, are all readily adjustable.

These and additional features of the invention will be made more apparent by the following description taken in connection with the accompanying drawings in which.

Figure 1:
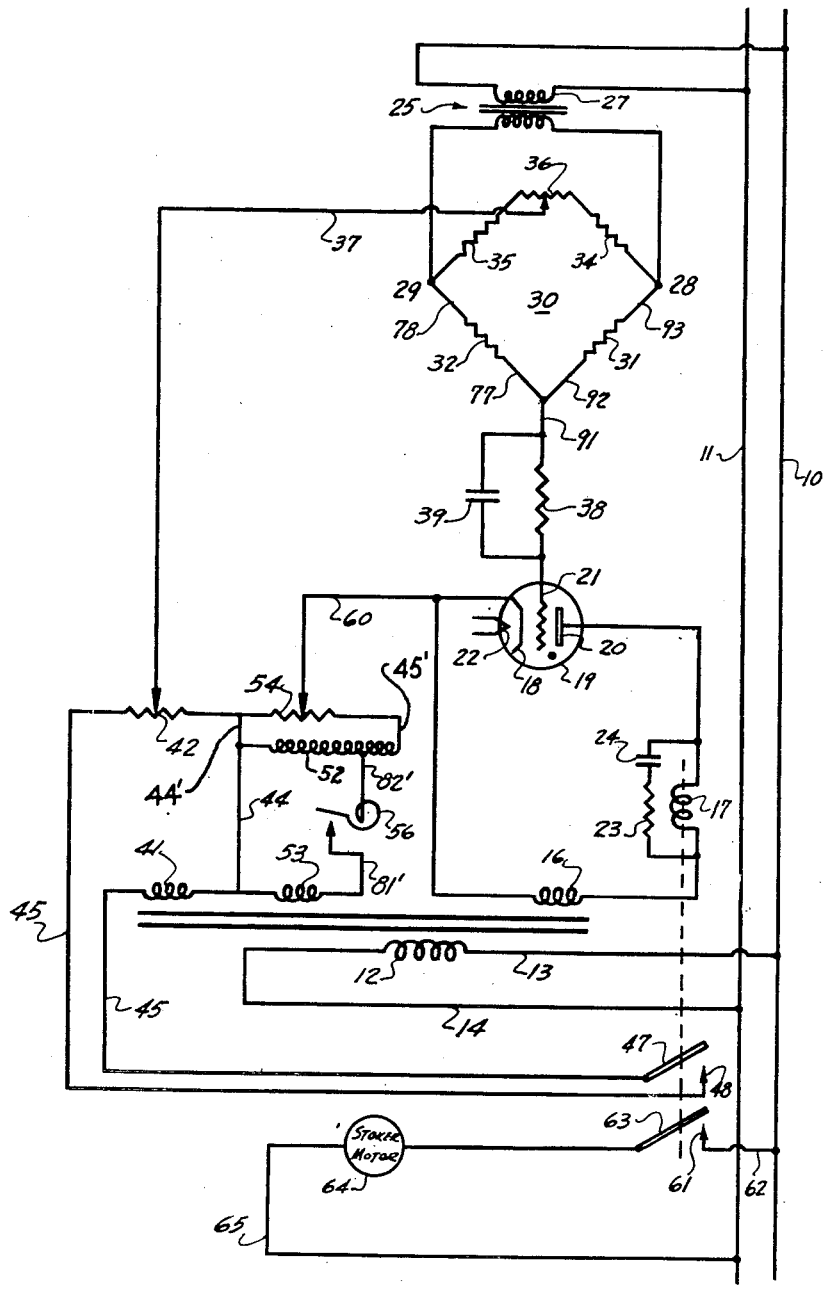
Fig. 1 is a circuit diagram showing an embodiment of the invention.

Referring to Fig. 1, numerals 10 and 11 indicate line voltage wires connected to a conventional 115 volt, 60 cycle source. Transformer primary 12 is connected across the lines 10 and 11 by means of conductors 13 and 14. Transformer primary 12 and secondary winding 16 comprises a step-up transformer whose output voltage at the terminals of secondary winding 16 may be of the order of 200 volts. Secondary winding 16 has one output terminal connected to one terminal of an electromagnetic means or relay 17, and the other output terminal connected to the cathode 18 of an electric discharge device or tube 19 which may be of the gas filled type. Cathode 18 is heated by filament 22 which is supplied with current from a suitable source in accordance with usual practice. The other terminal of relay 17 is connected to a plate 20 of tube 19 which utilizes a control electrode or grid 21. A condenser 24 and a resistance 23 are connected in parallel with relay 17 and serve to hold the relay 17 energized during the negative half cycles in a manner well known in the art.

Transformer 25 has its primary winding 27 connected across the lines 10 and 11 and its secondary connected to the junctions 28 and 29 of a bridge type resistance network 30, and applies thereto a voltage which may be of the order of 50 volts.

Figure 2:
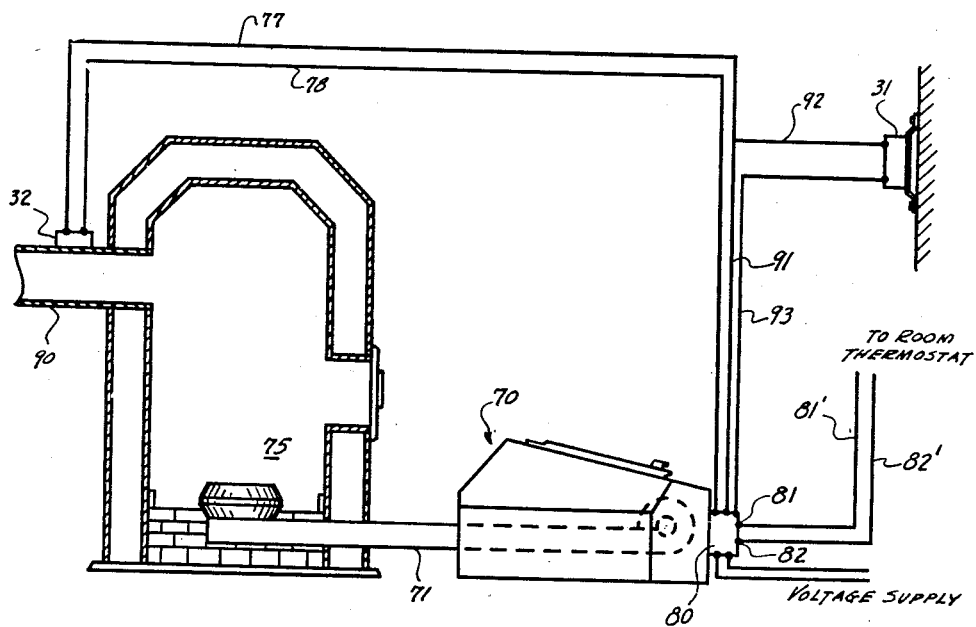
Fig. 2 is a diagrammatic showing of the location of some of the elements of the control circuit in relation to a fuel feeding means, such as a stoker.

Network 30 comprises resistances 31 and 32, two fixed resistors 34 and 35, and a potentiometer 36 which is connected at the junction of the fixed resistors 34 and 35 and to the cathode 18 of the tube 19 through conductor 37. Resistors 31 and 32 are connected into network 30 by means of conductors 92 and 93 and 77 and 78 respectively. As shown in Fig. 1, resistance 32 is of the thermistor type having a relatively large negative temperature coefficient of resistance and is shown in Fig. 2 to be secured in good heat conducting relation to the outside of smoke pipe 90. Resistance 31 may be a fixed resistance with no appreciable temperature coefficient of resistance, similar to resistances 34 and 35, under these conditions the output voltage value of the network 30 will not be compensated for changes in the ambient temperature of the area surrounding the heat exchanger or furnace 91. Compensation of the output voltage of the network 30 for changes in ambient temperature of the furnace room may be obtained by utilizing a thermistor element as resistance 31, and physically locating it at a point in the area near the furnace 91 not directly affected by radiation therefrom, as shown in Fig. 2. Resistance 32, or both resistances 31 and 32, may be wire wound resistances having relatively high positive temperature coefficients of resistance; if resistances 31 and 32 are in this form, their locations in network 30 must be interchanged, that is, the active resistance 32 which reacts to the temperature of the burning fuel must be placed in the upper leg of network 30 (the position occupied by resistance 32 in Fig. 1).

Control electrode 21 of the tube 19 is connected to the junction point of the two resistances 31 and 32 through a grid circuit network comprising conductor 91, resistor 38 and condenser 39.

Primary winding 12 induces in a transformer secondary winding 41 a voltage which may be of the order of six volts. The output terminals of secondary winding 41 are connected to the potentiometer 42 by means of conductors 44 and 45. Conductor 45 includes relay contacts 47 and 48 which are closed upon energization of relay 17.

The wiper arm of potentiometer 42 is connected to conductor 37. Potentiometer 42 permits adjustment of the voltage available at secondary 41.

Primary winding 12 also provides the output terminals of a transformer secondary winding 53 with a voltage which may be of the order of 26 volts. Secondary 53 is connected in circuit with an enclosure temperature responsive device, such as room thermostat 56, by means of conductor 81'. Conductor 82' connects room thermostat 56 with a point on an inductance 52 intermediate its ends. One end of inductance 52 is connected to conductor 44. A potentiometer resistance 54, similar to potentiometer resistance 42 is connected in series with potentiometer resistance 42 and in parallel with the inductance 52 by means of conductors 44' and 45'. The wiper arm of potentiometer 54 is connected to conductor 60 which connects with cathode 18 of the tube 19.

One contact 61 of a second normally open switch, which is closed upon energization of relay 17, is connected to line 10 by means of conductor 62. The other contact 63 of the relay controlled switch is connected to the electric fuel feeding means 64 illustrated in Fig. 1 to be a stoker motor, the other terminal of the fuel feeding means or stoker motor 64 being connected to line 11 by means of conductor 65.

Referring to Fig. 2, the numeral 70 refers to a conventional stoker mechanism having a fuel feeding passage 71 terminating in a combustion chamber 75. As shown, resistance 32 is located on the smoke pipe 90 in good thermal relation therewith and is connected by means of conductors 77 and 78 to terminals on the control housing 80. Control housing 80 may be mounted at any convenient location, such as on the stoker hopper as shown. Terminals 81 and 82 may be provided for conductors 81' and 82' connecting the room thermostat into the control circuit.

Resistance 31 may be placed at a location remote from the combustion chamber so that its temperature and correspondingly its resistance depends on an ambient temperature which is not directly influenced by the heat of combustion or burning fuel. If ambient compensation is desired, resistance 31 should have a temperature coefficient of resistance similar to that of resistance 32, as previously pointed out. As illustrated in Fig. 2, resistance 31 is located on a wall near the furnace. Assuming resistance 31 has a temperature coefficient of resistance similar to that of resistance 32, upon a change in ambient temperature, the resistance of resistor 31 changes in amount and direction sufficient to compensate the output of network 30 for ambient temperature changes.

Resistance 32 is shown in Fig. 2 to be secured to smoke pipe 90. Any other location for resistance 32 may be used provided that it is subjected to a temperature which closely corresponds to the temperature of the burning fuel.

In Fig. 1, transformer secondary 16, connected to anode 20, through relay 17 and to conductor 60, provides an anode or plate voltage for tube 19. Transformer secondaries 53 and 41 provide additional source of bias voltage for electrode 21, as will be described.

In operation, with room thermostat 56 open and with sufficient fuel in the combustion chamber to maintain combustion, potentiometer 36 may be so adjusted that the unbalanced voltage of the network 30 holds electrode 21 at a level just sufficiently negative with respect to cathode 18 to prevent tube 19 from conducting. Relay 17 therefore remains de-energized and contacts 47 and 63 remain separated from contacts 48 and 61 respectively.

Upon a slight decrease in temperature in the combustion chamber, indicating a drop in fuel combustion temperature, a holdfire operation of the fuel feeding means is initiated as follows: The resistance of resistor 32 changes upon the decrease in combustion chamber temperature allowing the resulting unbalanced voltage of network 30 to raise the voltage level of electrode 21 with respect to cathode 18 to a value sufficient to cause tube 19 to conduct. Relay 17 thereupon is energized closing contacts 47, 48 and 63, 61.

Closure of contacts 63 and 61 starts the fuel feeding means or stoker motor and additional fuel is fed to the combustion chamber. Closure of contacts 47 and 48 serves through conductors 45, 37 and network 30 to apply to electrode 21 an additional small biasing voltage increment which raises the voltage level of electrode 21 with respect to cathode 18. The magnitude of this additional electrode biasing potential may be adjusted by means of the manual adjusting means or potentiometer 42 which is connected across the output terminals of secondary 41. In order that tube 19 can again be rendered non-conductive to terminate the holdfire operation, the temperature of resistance 32 must now be raised to a value sufficient to produce an unbalanced voltage from network 30 large enough to neutralize the voltage increment applied to electrode 21 by secondary 41. When the combustion chamber temperature has been raised to this required value, the additional bias voltage having been neutralized by the unbalanced voltage of network 30, the voltage level of electrode 21 with respect to cathode 18 will again be below the level required to render tube 19 conductive and relay 17 will be de-energized terminating the holdfire operation of the stoker motor 64 and removing from electrode 21 the bias voltage increment introduced from secondary 41. Removal of this bias voltage increment thus resets to its original value the point to which the temperature of resistor 32 must fall before tube 19 can again be rendered conductive and a holdfire operation again initiated.

Should the temperature of the enclosure or space being heated drop to a value below the control point at which the room thermostat 56 has been set, the room thermostat 56 will close its contacts, allowing secondary 53 to apply to electrode 21, through inductance 52, conductors 44', 45', 37 and network 30, a relatively large voltage increment which raises the voltage level of electrode 21 with respect to cathode 18 far above the point at which tube 19 will be rendered conductive. Tube 19 thereupon becomes conductive, relay 17 is energized and the stoker motor 64 operates to feed fuel to the combustion chamber. The holdfire bias voltage from secondary 41 is additionally applied to electrode 21 since energization of relay 17 closes contacts 47 and 48.

The bias voltage increment supplied to electrode 21 by secondary 53 may be adjusted to any desirable value by means of potentiometer 54. It will also be noted that the voltage available at conductors 44' and 45' is higher than the output voltage induced in secondary 53, since inductance 52 acts as an auto-transformer. With this arrangement the size of secondary 53 and inductance 52 may be chosen so as to provide a current of a desirable value in the room thermostat circuit network comprising secondary 53, conductor 81', room thermostat 56, a portion of inductance 52, and conductor 44, and yet make available at conductors 44' and 45' a voltage large enough to produce the desirable biasing effect on electrode 21. In other words the voltage available at conductors 44' and 45' for biasing electrode 21 is not limited by the voltage induced in secondary 53. Since fixing the current in the room thermostat circuit at a desirable value and yet making available sufficient biasing potential is an important consideration in the design of electronic controls for heating plants, this feature forms an important part of the present invention.

It will be noted that resistor 32 must now be heated to such a temperature that both the bias voltages from secondaries 41 and 53 will be neutralized by the unbalanced network voltage supplied by transformer 25 before the voltage level of electrode 21 can be reduced to a value which will render tube 19 non-conductive. When resistor 32 is heated to the temperature referred to, the tube 19 will be rendered non-conductive and the operation of the stoker motor 64 will be terminated even though room thermostat 56 holds its contacts closed. For example, if potentiometer 54 is set so as to require resistance 32 to be heated to a temperature of 600° before tube 19 will be rendered non-conductive, upon closure of room thermostat 56, a fuel feeding operation will be initiated and will continue until resistance 32 is raised to a temperature of 600°. When this temperature is reached, the fuel feeding operation will be terminated and the electrode biasing voltage applied by secondary 41 will be removed, even though the room thermostat 56 holds its contacts closed. Removal of the bias voltage applied by secondary 41 makes it necessary that the temperature of resistance 32 decrease a small amount before the electrode biasing voltage applied by secondary 53 can again control tube 19 and render it conductive to again place the stoker motor 64 in operation. When the temperature of resistance 32 has decreased this small amount, tube 19 is again rendered conductive and relay 17 is energized to again start operation of the stoker motor 64 and to again apply the small biasing voltage increment produced by secondary 41 to the control electrode 21. Reapplication of this small biasing voltage increment again resets to 600° the value to which the temperature of resistance 31 must be raised before operation of the stoker motor 64 will be terminated. This cycle will be repeated as long as room thermostat 55 holds its contacts closed. Thus upon closure of the contacts of room thermostat 56, the fuel feeding means 64 will be operated until the combustion chamber temperature is approximately 600°, the fuel feeding means will then be shut down until the combustion chamber temperature falls a small amount, after which the fuel feeding means 64 will again be made to operate to raise the combustion chamber back to approximately 600°. This cycle of operation will continue until the room thermostat 56 is satisfied as indicated by opening of its contacts. This mode of operation whereby the combustion chamber temperature is not raised above a predetermined value is advantageous in preventing "overshooting" of the control temperature for which thermostat 56 is set and also in preventing overheating and consequent damage to the stoker tuyères or other parts of the fuel feeding mechanism located within the combustion chamber.

From the description of operation it will be apparent that for proper operation of the described circuit the transformer secondaries 41, 53, 16 and the secondary of transformer 25 should have the following instantaneous polarity: as viewed in Fig. 1, when the right hand end of secondary 16 and the right hand end of the secondary of transformer 25 are positive, the right hand ends of secondaries 41 and 53 are negative.

Tube 19 is shown in Fig. 1 to be a gas-filled triode, however, other tubes having additional electrodes and different characteristics may also satisfactorily fill the requirements of successful operation of the circuit herein described.

Various modifications coming within the spirit of the invention may suggest themselves to those skilled in the art and hence the invention is not to be limited to the specific form shown, except to the extent indicated in the appended claims.

What is claimed is:

1. Control means adapted to control the operation of an electric fuel feeding device of the type which is actuated by an enclosure temperature responsive means including: a normally open switch in circuit with said fuel feeding means and controlling energization thereof, electromagnetic means for closing said switch, an electric discharge device having an anode, cathode and control electrode, a connecting circuit for said anode, said cathode, a voltage source and said electromagnetic means, a circuit network for controlling conduction through said electric discharge device, said network including a source of power and said enclosure temperature responsive means, an inductance coil having a portion thereof connected in series with said enclosure temperature responsive means for limiting the flow of current therethrough, and means for connecting opposite ends of said inductance coil with said control electrode and said cathode respectively.

2. Control means adapted to control the operation of an electric fuel feeding device of the type which is actuated by an enclosure temperature responsive switch and is operative when actuated to feed fuel to a combustion chamber, said control means including: a main switch controlling energization of said fuel feeding means; electromagnetic means for actuating said switch; an electric discharge device having an anode, cathode, and control electrode controlling energization of said electromagnetic means and adapted to cause energization of said electromagnetic means only when the voltage level of said control electrode with respect to said cathode is greater than a predetermined value; a first circuit connecting a first source of voltage across said cathode and said control electrode for establishing a voltage level of said control electrode with respect to said cathode, said first circuit including means for varying said voltage level, said last mentioned means comprising combustion temperature responsive means for increasing said voltage level as said combustion temperature decreases and decreasing said voltage level as said combustion temperature increases thereby causing energization of said electromagnetic means upon a decrease in combustion temperature below a predetermined value and de-energization of said electromagnetic means upon an increase in combustion temperature above a predetermined value; a second circuit connecting a second voltage source across said cathode and said control electrode, said second circuit including an auxiliary switch closed upon energization of said electromagnetic means, said second circuit being completed upon closure of said auxiliary switch to further increase the voltage level of said control electrode with respect to said cathode and maintain energization of said electromagnetic means until the subsequent increase in combustion temperature has compensated for the increase in said voltage level established upon closure of said auxiliary switch; a third circuit connecting a third voltage source across said cathode and said control electrode, said third circuit including said enclosure temperature responsive switch and completed upon closure of said switch in response to a decrease in the enclosure temperature below a predetermined value to increase the voltage level of said control electrode with respect to said cathode sufficient to energize said electromagnetic means until the subsequent increase in combustion temperature has compensated for both the increase in said voltage level established on closure of said auxiliary switch and the increase in said voltage level established upon closure of said temperature responsive switch.

3. Control means adapted to control the operation of an electric fuel feeding device of the type which is actuated by an enclosure temperature responsive means and is operative when actuated to feed fuel to a combustion chamber, said control means including: a normally open switch in circuit with said fuel feeding means and controlling energization thereof; electromagnetic means for closing said switch; an electric discharge device having an anode, cathode and control electrode; a connecting circuit for said anode, said cathode, a voltage source and said electromagnetic means for controlling energization of said electromagnetic means; combustion temperature responsive means in circuit with said control electrode and a voltage source for adjusting the voltage level of said electrode with respect to said cathode; a normally open switch closed upon energization of said electromagnetic means and connected in circuit with said control electrode, said cathode and a voltage source and adapted when closed to apply to said electrode a relatively small voltage increment which changes positively the voltage level of said control electrode with respect to said cathode; said enclosure temperature responsive means being connected in circuit with said control electrode, said cathode and a voltage source and effective, when closed in response to a decrease in the enclosure temperature below a predetermined value, to apply to said electrode a relatively large voltage increment which changes positively the voltage level of said control electrode with respect to said cathode.

4. Control means adapted to control the operation of an electrically operated stoker of the type which is actuated by a remote thermostat including: a normally open switch in circuit with said stoker and controlling energization thereof, electromagnetic means for closing said switch, an electric discharge device having an anode, cathode and control electrode, a connecting circuit for said anode, said cathode, a voltage source and said electromagnetic means, a circuit network for controlling conduction through said electric discharge device, said network including a source of power and said thermostat, an inductance coil having a portion thereof connected in series with said thermostat for limiting the flow of current therethrough, and means for connecting opposite ends of said inductance coil with said control electrode and said cathode respectively.

JUSTIN A. DEUBEL.

REFERENCES CITED

The following references are of record in the file of this patent:

UNITED STATES PATENTS

| Number | Name | Date |
|---|---|---|
| 1,925,822 | Shurtleff | Sept. 5, 1933 |
| 2,236,624 | Littwin | Apr. 1, 1941 |
| 2,366,500 | Eastin | Jan. 2, 1945 |
| 2,366,501 | Gille | Jan. 2, 1945 |
| 2,375,988 | Gille | May 15, 1945 |
| 2,423,541 | Wilson | July 8, 1947 |
| 2,487,556 | Jenkins | Nov. 8, 1949 |

FOREIGN PATENTS

| Number | Country | Date |
|---|---|---|
| 144,669 | Great Britain | Sept. 9, 1921 |